United States Patent
Liu

(10) Patent No.: US 9,876,687 B2
(45) Date of Patent: Jan. 23, 2018

(54) METHOD AND APPARATUS FOR SELECTING PREFERRED PARENT NODE IN WIRELESS SENSOR NETWORK

(71) Applicant: Huawei Technologies Co., Ltd., Shenzhen (CN)

(72) Inventor: Pei Liu, Beijing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 208 days.

(21) Appl. No.: 15/055,297

(22) Filed: Feb. 26, 2016

(65) Prior Publication Data

US 2016/0182306 A1    Jun. 23, 2016

Related U.S. Application Data

(63) Continuation of application No. PCT/CN2013/082443, filed on Aug. 28, 2013.

(51) Int. Cl.
| | |
|---|---|
| *H04L 12/28* | (2006.01) |
| *H04L 12/24* | (2006.01) |
| *H04W 84/18* | (2009.01) |
| *H04W 16/18* | (2009.01) |

(52) U.S. Cl.
CPC ............. *H04L 41/12* (2013.01); *H04W 16/18* (2013.01); *H04W 84/18* (2013.01)

(58) Field of Classification Search
CPC ......... H04L 45/48; H04L 45/02; H04L 45/22; H04L 45/14; H04W 4/18
See application file for complete search history.

(56) References Cited

U.S. PATENT DOCUMENTS

| | | | |
|---|---|---|---|
| 2012/0082065 A1 | 4/2012 | Yanagihara et al. | |
| 2013/0188513 A1 | 7/2013 | Vasseur et al. | |
| 2014/0204759 A1* | 7/2014 | Guo .................. | H04W 28/08 370/236 |

(Continued)

FOREIGN PATENT DOCUMENTS

| | | |
|---|---|---|
| CN | 101895419 A | 11/2010 |
| EP | 2381737 A1 | 10/2011 |

OTHER PUBLICATIONS

Thubert, "RPL Objective Function Zero," ROLL, Internet-Draft, IETF Trust, Reston, Virginia (Sep. 5, 2011).

(Continued)

*Primary Examiner* — Shukri Taha
(74) *Attorney, Agent, or Firm* — Leydig, Voit & Mayer, Ltd.

(57) ABSTRACT

Embodiments of the disclosure provide a method and an apparatus for selecting a preferred parent node in a wireless sensor network, and the method includes: according to all received DIO messages, separately acquiring, by a first node, node identification information carried in each of the DIO messages and generates a parent node set; selecting, by the first node, a fixed node with a highest performance parameter level as a preferred parent node when it is determined that the parent node set includes at least two fixed nodes; and selecting, by the first node, a mobile node with a highest performance parameter level as the preferred parent node when it is determined that the parent node set does not include a fixed node, and includes at least two mobile nodes.

18 Claims, 13 Drawing Sheets

(56) References Cited

U.S. PATENT DOCUMENTS

2017/0237669 A1* 8/2017 Hui .................. H04L 47/22
370/230.1

OTHER PUBLICATIONS

Gormus et al., "Opportunistic Communications to Improve Reliability of AMI Mesh Networks," 2nd IEEE PES International Conference and Exhibition on Innovative Smart Grid Technologies (ISGT Europe), Institute of Electrical and Electronics Engineers, New York, New York (Dec. 5-7, 2011).
Song et al., "Analysis of RPL Routing Technology in Smart Objects Networks," Telecommunications Network Technology, No. 9 (Sep. 9, 2011).
Safdar et al., "A hybrid routing protocol for wireless sensor networks with mobile sinks," 2012 $7^{th}$ International Symposium on Wireless and Pervasive Computing (ISWPC), Dalian, China, pp. 1-5, Institute of Electrical and Electronics Engineers, New York, New York (Jul. 3-5, 2012).
Korbi et al., "Mobility Enhanced RPL for Wireless Sensor Networks," 2012 $3^{rd}$ International Conference on the Network of the Future (NOF), Gammarth, Tunisia, pp. 1-8, Institute of Electrical and Electronics Engineers, New York, New York (Nov. 21-23, 2012).
Winter et al., "IPv6 Routing Protocol for Low-Power and Lossy Networks," Request for Comments 6550, pp. 1-157, IETF Trust, Reston, Virginia (Mar. 2012).

\* cited by examiner

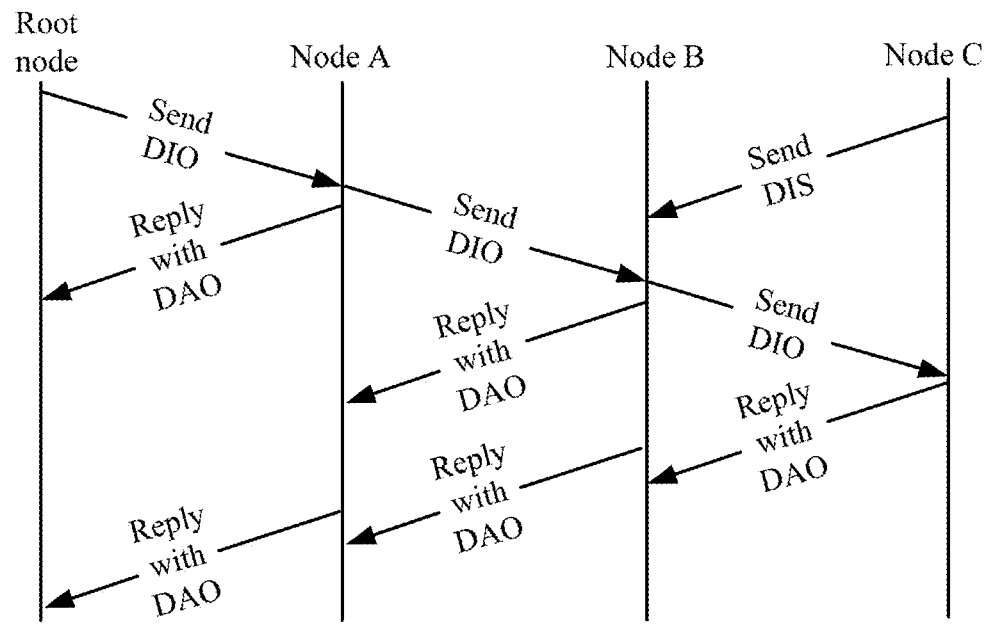
PRIOR ART FIG. 1
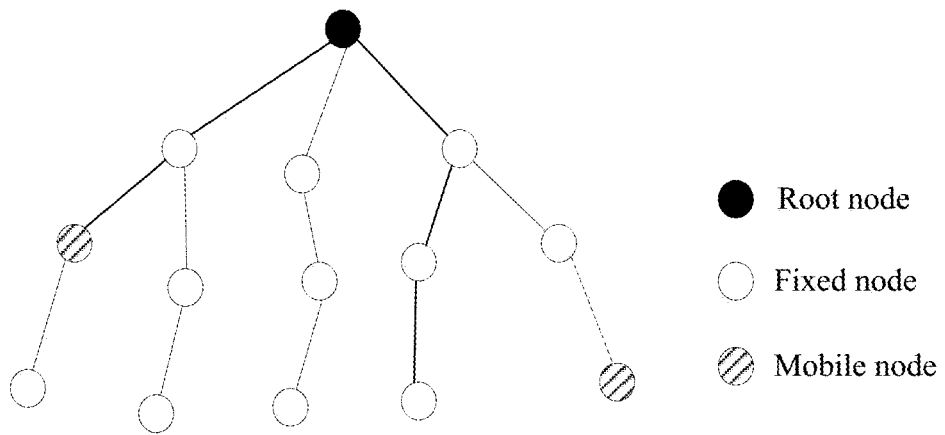
PRIOR ART FIG. 2

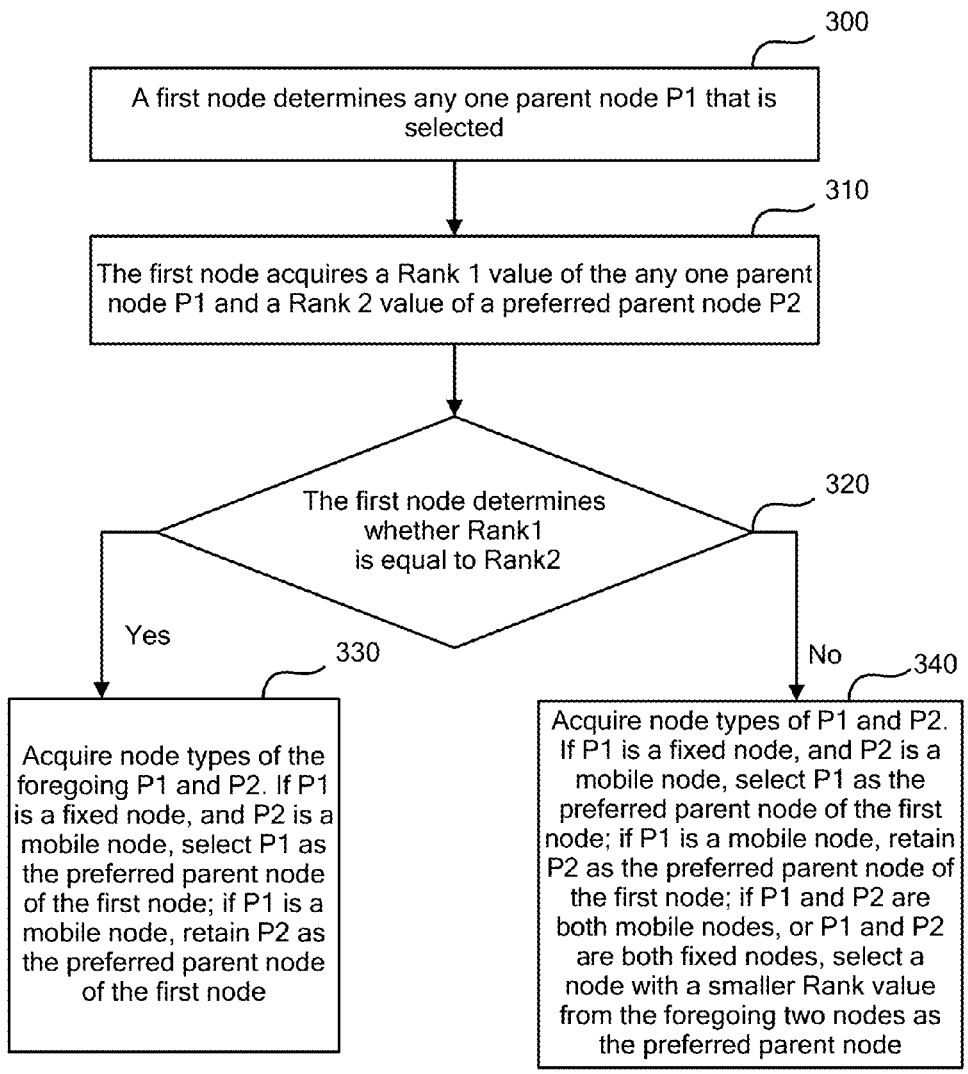
PRIOR ART FIG. 3

METHOD AND APPARATUS FOR SELECTING PREFERRED PARENT NODE IN WIRELESS SENSOR NETWORK

CROSS-REFERENCE TO RELATED APPLICATIONS

This application is a continuation of International Patent Application No. PCT/CN2013/082443, filed on Aug. 28, 2013, which is incorporated herein by reference in its entirety.

TECHNICAL FIELD

The present disclosure relates to the field of communications technologies, and in particular, to a method and an apparatus for selecting a preferred parent node in a wireless sensor network.

BACKGROUND

Each node in an IPv6 (Internet Protocol Version 6; Internet Protocol Version 6) wireless sensor network corresponds to a specific range that the transmit power can cover. When some nodes cannot access a network within their power sending ranges, the some nodes access the network by using another node.

In the IPv6 wireless sensor network, a process in which a node (hereinafter referred to as a first node) accesses the network by using another node is as follows: After receiving a DIO (Destination Oriented Directed Acyclic Graph Information Object) message sent by the another node, the first node selects a preferred parent node according to a target function and an acyclic graph that are carried in the DIO message, and accesses the network by using the preferred parent node. For example, referring to prior art FIG. 1, a root node sends a DIO message by broadcasting; after a node A adjacent to the root node (that is, within a power sending range of the root node) receives the DIO message sent by the root node, the node A acquires an acyclic graph carried in the DIO message; in addition, the node A joins the foregoing acyclic graph, updates the acyclic graph, and replies to the root node with a DAO (Destination Advertisement Object) message; the node A sends a DIO message by broadcasting; after a node B within a power sending range of the node A receives the foregoing DIO message, the node B acquires an updated acyclic graph carried in the DIO message; after the node B joins the foregoing updated acyclic graph, the node B updates the acyclic graph again, and in addition, the node B replies to the node A with a DAO message. After a wireless sensor network is enabled and after the node B receives a DIS (Destination Oriented Directed Acyclic Graph information Solicitation) message sent by a node C, the node B sends a DIO message to the node C, requesting the node C to join the foregoing acyclic graph that is update again; the node C sends a DAO message to its parent node B based on the DIO message; after receiving the DAO message sent by the node C, the node B integrates acyclic graph information, and feeds back DAO information to the node A, so that the node A feeds back the foregoing DAO information fed back by the node B to the root node. The node C then can connect to the root node by using the node A, and access the network by using the root node.

At present, the foregoing IPv6 wireless sensor network may be applied to a mobile scenario, that is, a scenario in which a mobile node exists in the foregoing wireless sensor network. The RPL (IPv6 Routing Protocol for Low-Power and Lossy Networks) does not provide a rule for selecting a preferred parent node in the mobile scenario, and a feature of an unfixed location of the mobile node may lead to poor link quality. Therefore, when the foregoing IPv6 wireless sensor network is applied to the mobile scenario, if a preferred parent node is still selected according to a target function and an acyclic graph that are carried in a DIO message in the mobile scenario, problems of a packet loss and network instability easily arise in a communication process.

Based on the foregoing technical problems, generally, it is determined, in a manner of comparing a Rank value of a preferred parent node of a first node with a Rank value of any one parent node in all parent nodes of the first node, whether to replace the preferred parent node with the any one parent node, where a network topology view is shown in prior art FIG. 2. Referring to prior art FIG. 3, a process of changing a preferred parent node by using a Rank value is as follows:

Step 300: A first node determines any one parent node P1 that is selected.

The first node is a mobile node or a fixed node, and a preferred parent node of the first node is P2, where P2 may be a mobile node or a fixed node.

Step 310: The first node acquires a Rank 1 value of the any one parent node P1 and a Rank 2 value of a preferred parent node P2.

Step 320: The first node determines whether Rank 1 is equal to Rank 2. If yes, step 330 is performed; otherwise, step 340 is performed.

Step 330: Acquire node types of the foregoing P1 and P2. If P1 is a fixed node and P2 is a mobile node, Select P1 as the preferred parent node of the first node; if P1 is a mobile node, retain P2 as the preferred parent node of the first node.

Step 340: Acquire node types of P1 and P2. If P1 is a fixed node and P2 is a mobile node, select P1 as the preferred parent node of the first node; if P1 is a mobile node, retain P2 as the preferred parent node of the first node; if P1 and P2 are both mobile nodes, or P1 and P2 are both fixed nodes, select a node with a smaller Rank value from the foregoing two nodes as the preferred parent node.

It may be learned from FIG. 3 that, in a manner of determining a preferred parent node of a first node in the foregoing mobile scenario, the preferred parent node of the first node is already selected, and a Rank value of the preferred parent node of the first node is compared only with a Rank value of one parent node of the first node. When there are multiple parent nodes of the first node, the foregoing process is executed for any one parent node, resulting in a long processing time. In addition, because a Rank value of each node cannot reflect a feature of the node, selecting a preferred parent node by using a Rank value of a parent node leads to an inaccurate comparison result, and the selected preferred parent node is not an optimal parent node. Consequently, a problem of a high packet loss rate arises; in addition, a change of the preferred parent node also causes a problem of network instability.

It may be seen that, at present, when an IPv6 wireless sensor network is applied to a mobile scenario, problems of a high packet loss rate and poor network performance exist in a method for selecting a preferred parent node for any one node in the wireless sensor network.

SUMMARY

Embodiments of the present disclosure provide a method and an apparatus for selecting a preferred parent node in a wireless sensor network, so as to resolve current problems of a high packet loss rate and poor network performance that arise when an IPv6 wireless sensor network is applied to a mobile scenario and when a preferred parent node is selected for any one node in the wireless sensor network.

According to a first aspect, a method for selecting a preferred parent node in a wireless sensor network is provided, including:

for all received Destination Oriented Directed Acyclic Graph Information Object DIO messages, separately acquiring node identification information carried in each of the DIO messages, and generating a parent node set based on all the acquired node identification information;

selecting a fixed node with a highest performance parameter level as a preferred parent node when it is determined that the parent node set includes at least two fixed nodes; and selecting a mobile node with a highest performance parameter level as the preferred parent node when it is determined that the parent node set does not include a fixed node, and includes at least two mobile nodes.

With reference to the first aspect, in a first possible implementation manner, when it is determined that the parent node set includes one fixed node, the fixed node is selected as the preferred parent node.

With reference to the first aspect, in a second possible implementation manner, according to a DIO message carrying node identification information corresponding to each fixed node in the parent node set, a Rank value of each fixed node is acquired, and a received signal strength indicator RSSI value of each fixed node is measured; and a performance parameter level table is generated based on the Rank value and RSSI value of each fixed node, and a fixed node with a highest performance parameter level in the performance parameter level table is selected as the preferred parent node.

With reference to the second possible implementation manner of the first aspect, in a third possible implementation manner, when the parent node set includes at least two fixed nodes with a highest performance parameter level, a fixed node with a minimum Rank value in the at least two fixed nodes is selected as the preferred parent node.

With reference to the first aspect, in a fourth possible implementation manner, when it is determined that the parent node set does not include a fixed node, and includes one mobile node, the mobile node is selected as the preferred parent node.

With reference to the first aspect, in a fifth possible implementation manner, according to a DIO message carrying node identification information corresponding to each mobile node in the parent node set, a Rank value of each mobile node is acquired, and an RSSI value of each mobile node is measured; and a performance parameter level table is generated based on the Rank value and RSSI value of each mobile node, and a mobile node with a highest performance parameter level in the performance parameter level table is selected as the preferred parent node.

With reference to the fifth possible implementation manner of the first aspect, in a sixth possible implementation manner, when the parent node set includes at least two mobile nodes with a highest performance parameter level, a mobile node with a maximum RSSI value in the at least two mobile nodes is selected as the preferred parent node.

With reference to the second possible implementation manner or the fifth possible implementation manner of the first aspect, in a seventh possible implementation manner, Rank values of all fixed nodes or all mobile nodes in the parent node set are acquired, and the Rank values of all the fixed nodes or all the mobile nodes are sorted in ascending order to generate a Rank list, and levels are assigned in descending order to the values in the Rank list in sequence; RSSI values of all the fixed nodes or all the mobile nodes in the parent node set are acquired, the RSSI values of all the fixed nodes or all the mobile nodes are sorted in descending order to generate an RSSI list, and levels are assigned in descending order to the values in the RSSI list in sequence; and according to the Rank value and RSSI value of each fixed node or each mobile node in the parent node set, the node identification information of the fixed node or the mobile node is added to a corresponding location in a two-dimensional table, so as to generate the performance parameter level table.

According to a second aspect, an apparatus for selecting a preferred parent node in a wireless sensor network is provided, including:

an acquiring unit, configured to: for all received Destination Oriented Directed Acyclic Graph Information Object DIO messages, separately acquire node identification information carried in each of the DIO messages, and send the node identification information to a generating unit;

the generating unit, configured to: receive the node identification information sent by the acquiring unit, generate a parent node set based on all the node identification information, and send the parent node set to a selecting unit; and the selecting unit, configured to: receive the parent node set sent by the selecting unit; select a fixed node with a highest performance parameter level as a preferred parent node when it is determined that the parent node set includes at least two fixed nodes; and select a mobile node with a highest performance parameter level as the preferred parent node when it is determined that the parent node set does not include a fixed node, and includes at least two mobile nodes.

With reference to the second aspect, in a first possible implementation manner, the selecting unit is further configured to: when it is determined that the parent node set includes one fixed node, select the fixed node as the preferred parent node.

With reference to the second aspect, in a second possible implementation manner, the selecting unit is configured to: according to a DIO message carrying node identification information corresponding to each fixed node in the parent node set, acquire a Rank value of each fixed node, and measure a received signal strength indicator RSSI value of each fixed node; and generate a performance parameter level table based on the Rank value and RSSI value of each fixed node, and select a fixed node with a highest performance parameter level in the performance parameter level table as the preferred parent node.

With reference to the second possible implementation manner of the second aspect, in a third possible implementation manner, when the parent node set includes at least two fixed nodes with a highest performance parameter level, a fixed node with a minimum Rank value in the at least two fixed nodes is selected as the preferred parent node.

With reference to the second aspect, in a fourth possible implementation manner, when it is determined that the parent node set does not include a fixed node, and includes one mobile node, the mobile node is selected as the preferred parent node.

With reference to the second aspect, in a fifth possible implementation manner, according to a DIO message carrying node identification information corresponding to each mobile node in the parent node set, a Rank value of each mobile node is acquired, and an RSSI value of each mobile node is measured; and a performance parameter level table is generated based on the Rank value and RSSI value of each mobile node, and a mobile node with a highest performance parameter level in the performance parameter level table is selected as the preferred parent node.

With reference to the fifth possible implementation manner of the second aspect, in a sixth possible implementation manner, when the parent node set includes at least two mobile nodes with a highest performance parameter level, a mobile node with a maximum RSSI value in the at least two mobile nodes is selected as the preferred parent node.

With reference to the second possible implementation manner or the fifth possible implementation manner of the second aspect, in a seventh possible implementation manner, Rank values of all fixed nodes or all mobile nodes in the parent node set are acquired, the Rank values of all the fixed nodes or all the mobile nodes are sorted in ascending order to generate a Rank list, and levels are assigned in descending order to the values in the Rank list in sequence; RSSI values of all the fixed nodes or all the mobile nodes in the parent node set are acquired, the RSSI values of all the fixed nodes or all the mobile nodes are sorted in descending order to generate an RSSI list, and levels are assigned in descending order to the values in the RSSI list in sequence; and according to the Rank value and RSSI value of each fixed node or each mobile node in the parent node set, the node identification information of the fixed node or the mobile node is added to a corresponding location in a two-dimensional table, so as to generate the performance parameter level table.

According to a third aspect, a device for selecting a preferred parent node in a wireless sensor network is provided, including:

a transceiver, configured to receive a DIO message sent by another node;

a memory, configured to store an application program; and a processor, configured to invoke the application program in the memory to perform the following operations:

for all received DIO messages, separately acquiring node identification information carried in each of the DIO messages, and generating a parent node set based on all the acquired node identification information; selecting a fixed node with a highest performance parameter level as a preferred parent node when it is determined that the parent node set includes at least two fixed nodes; and selecting a mobile node with a highest performance parameter level as the preferred parent node when it is determined that the foregoing parent node set does not include a fixed node, and includes at least two mobile nodes.

With reference to the third aspect, in a first possible implementation manner, the processor is further configured to: when it is determined that the parent node set includes one fixed node, select the fixed node as the preferred parent node.

With reference to the third aspect, in a second possible implementation manner, the processor is configured to: according to a DIO message carrying node identification information corresponding to each fixed node in the parent node set, acquire a Rank value of each fixed node, and measure a received signal strength indicator RSSI value of each fixed node; and generate a performance parameter level table based on the Rank value and RSSI value of each fixed node, and select a fixed node with a highest performance parameter level in the performance parameter level table as the preferred parent node.

With reference to the second possible implementation manner of the third aspect, in a third possible implementation manner, the processor is further configured to: when the parent node set includes at least two fixed nodes with a highest performance parameter level, select a fixed node with a minimum Rank value in the at least two fixed nodes as the preferred parent node.

With reference to the third aspect, in a fourth possible implementation manner, the processor is further configured to: when it is determined that the parent node set does not include a fixed node, and includes one mobile node, select the mobile node as the preferred parent node.

With reference to the third aspect, in a fifth possible implementation manner, the processor is configured to: according to a DIO message carrying node identification information corresponding to each mobile node in the parent node set, acquire a Rank value of each mobile node, and measure an RSSI value of each mobile node; and generate a performance parameter level table based on the Rank value and RSSI value of each mobile node, and select a mobile node with a highest performance parameter level in the performance parameter level table as the preferred parent node.

With reference to the fifth possible implementation manner of the third aspect, in a sixth possible implementation manner, the processor is further configured to: when the parent node set includes at least two mobile nodes with a highest performance parameter level, select a mobile node with a maximum RSSI value in the at least two mobile nodes as the preferred parent node.

With reference to the second possible implementation manner or the fifth possible implementation manner of the third aspect, in a seventh possible implementation manner, the processor is further configured to: acquire Rank values of all fixed nodes or all mobile nodes in the parent node set, sort the Rank values of all the fixed nodes or all the mobile nodes in ascending order to generate a Rank list, and assign levels in descending order to the values in the Rank list in sequence; acquire RSSI values of all the fixed nodes or all the mobile nodes in the parent node set, sort the RSSI values of all the fixed nodes or all the mobile nodes in descending order to generate an RSSI list, and assign levels in descending order to the values in the RSSI list in sequence; and according to the Rank value and RSSI value of each fixed node or each mobile node in the parent node set, add the node identification information of the fixed node or the mobile node to a corresponding location in a two-dimensional table, so as to generate the performance parameter level table.

In embodiments of the present disclosure, after any one node in a wireless sensor network receives a DIO message sent by another node, a parent node set is generated based on the DIO message; when the parent node set includes a fixed node, a fixed node with a highest performance parameter level is preferably selected as a preferred parent node of the foregoing any one node, and when the foregoing parent node set does not include a fixed node, and only includes a mobile node, a mobile node with a highest performance parameter level is preferably selected as the preferred parent node of the foregoing any one node. In the technical solutions of the disclosure, the preferred parent node is selected for the foregoing any one node according to a node type and a performance parameter level that are of each node in the parent node set in sequence, which ensures that the selected preferred parent node is an optimal parent node in parent nodes of the any one node, thereby reducing a system packet loss rate and improving network performance.

BRIEF DESCRIPTION OF DRAWINGS

FIG. 1 illustrates a process of constructing an acyclic graph in a wireless sensor network in the prior art;

FIG. 2 is a schematic diagram of a network topology in a wireless sensor network in the prior art;

FIG. 3 is a flowchart of selecting a preferred parent node in a wireless sensor network in the prior art;

DESCRIPTION OF EMBODIMENTS

To make the objectives, technical solutions, and advantages of the embodiments of the present disclosure clearer, the following clearly describes the technical solutions in the embodiments of the present disclosure with reference to the accompanying drawings in the embodiments of the present disclosure. Apparently, the described embodiments are some but not all of the embodiments of the present disclosure. All other embodiments obtained by persons of ordinary skill in the art based on the embodiments of the present disclosure without creative efforts shall fall within the protection scope of the present application.

To resolve problems of a high packet loss rate and poor network performance that exist in a method for selecting a preferred parent node for any one node in an IPv6 wireless sensor network when the wireless sensor network is applied to a mobile scenario, in the embodiments of the disclosure, after the any one node in the wireless sensor network receives a DIO message sent by another node, a parent node set is generated based on the DIO message; when the parent node set includes a fixed node, a fixed node with a highest performance parameter level is preferably selected as a preferred parent node of the foregoing any one node; and when the foregoing parent node set does not include a fixed node, and only includes a mobile node, a mobile node with a highest performance parameter level is preferably selected as the preferred parent node of the foregoing any one node. In the technical solutions of the disclosure, the preferred parent node is selected for the foregoing any one node according to a node type and a performance parameter level that are of each node in the parent node set in sequence, which ensures that the selected preferred parent node is an optimal parent node in parent nodes of the any one node, thereby reducing a system packet loss rate and improving network performance.

The following describes exemplary implementation manners of the present disclosure in detail with reference to accompanying drawings.

Figure 4:
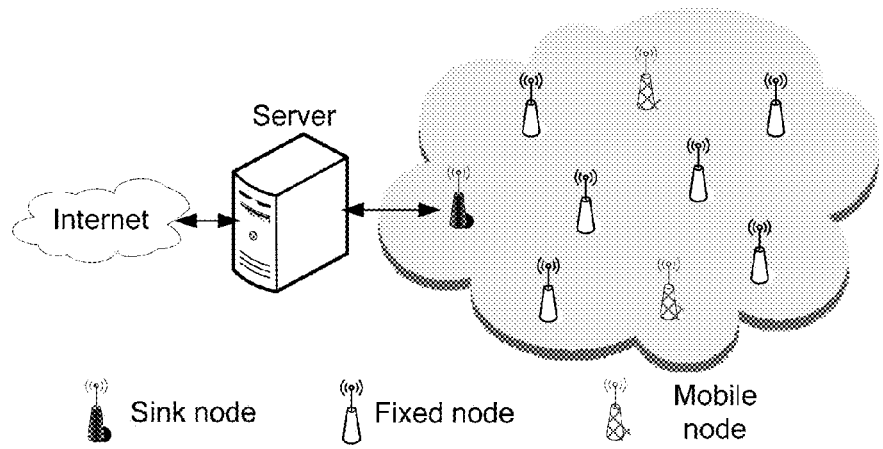
FIG. 4 is a diagram of an architecture of a wireless sensor network according to an embodiment of the disclosure.

Referring to FIG. 4, which shows a diagram of an architecture of a wireless sensor network according to an embodiment of the disclosure, the wireless sensor network includes a mobile node, a fixed node, a root node, and a server, where the foregoing mobile node and fixed node are connected to the root node by using respective parent nodes, or the foregoing mobile node and fixed node are directly connected to the root node, and then are connected to the server by using the root node, and access a network by using the server.

Figure 5:
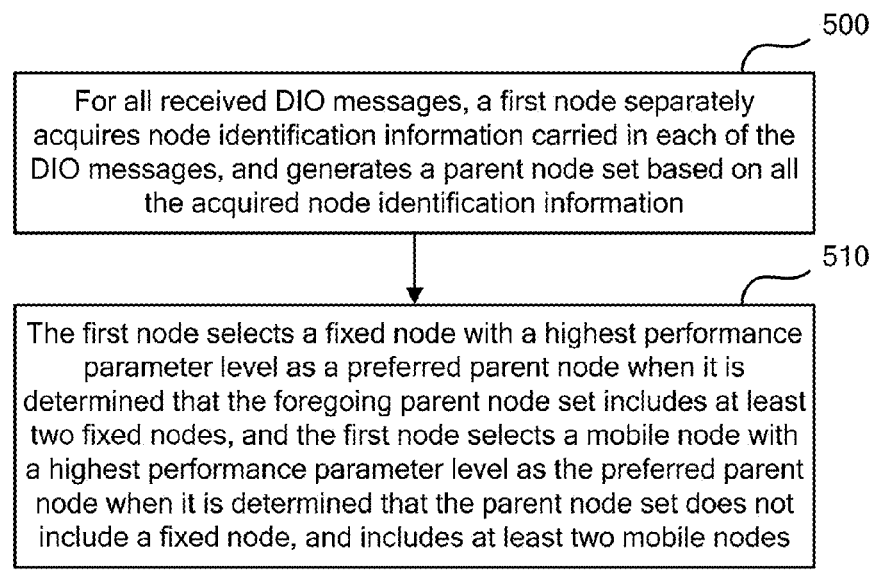
FIG. 5 is a flowchart of selecting a preferred parent node in a wireless sensor network according to an embodiment of the disclosure.

Referring to FIG. 5, in an embodiment of the disclosure, a process of selecting a preferred parent node in a wireless sensor network is as follows:

Step 500: For all received DIO messages, a first node separately acquires node identification information carried in each of the DIO messages, and generates a parent node set based on all the acquired node identification information.

Figure 6:
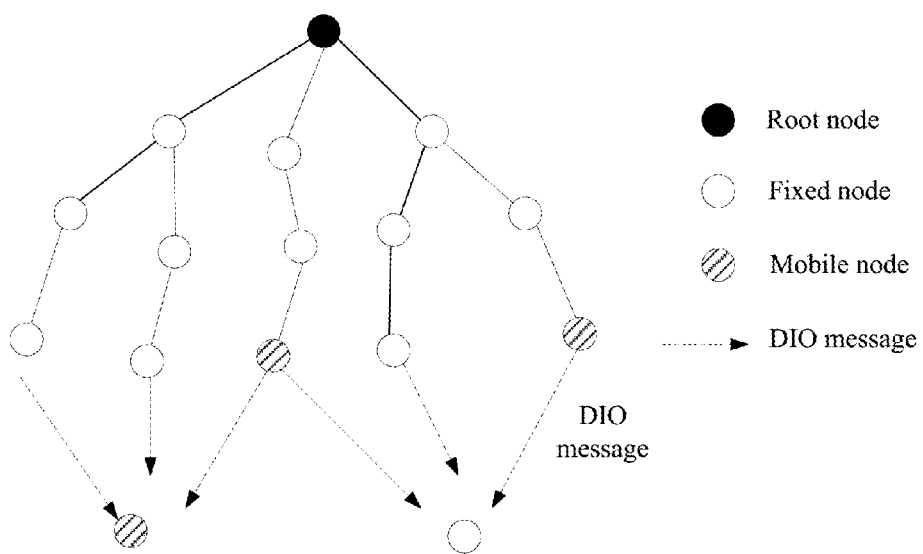
FIG. 6 is a schematic diagram of a network topology in a wireless sensor network according to an embodiment of the disclosure.

In an embodiment of the disclosure, referring to FIG. 6, in a process of constructing an acyclic graph of a wireless sensor network, each node that has joined the acyclic graph broadcasts a DIO message, and a first node receives a DIO message sent by another node, where the DIO message carries node identification information, and according to a difference in node types included in the node identification information, all nodes are classified into a fixed node and a mobile node.

Based on the identification information of each node, the first node integrates the node identification information of all the nodes, and generates the parent node set. That is, each node that sends the DIO message to the first node is regarded as a parent node of the first node, and each node and the corresponding node identification information are stored in the foregoing parent node set.

Step 510: The first node selects a fixed node with a highest performance parameter level as a preferred parent node when it is determined that the foregoing parent node set includes at least two fixed nodes, and the first node selects a mobile node with a highest performance parameter level as the preferred parent node when it is determined that the parent node set does not include a fixed node, and includes at least two mobile nodes.

In this embodiment of the disclosure, the parent node set may include one fixed node and a mobile node, may also include at least two fixed nodes and a mobile node, and further, may not include a fixed node and only include a mobile node, which is specifically as follows:

When the foregoing parent node set includes multiple parent nodes, and only one parent node in the multiple parent nodes is a fixed node, the first node selects the fixed node as the preferred parent node. According to the foregoing technical solution, the fixed node in the parent node set is preferably selected as the preferred parent node. A feature of higher stability of the fixed node itself can ensure a lower packet loss rate for the first node in a subsequent communication process.

Further, when the foregoing parent node set includes at least two fixed nodes, according to a DIO message carrying node identification information corresponding to each fixed node in the parent node set, the first node acquires a Rank value of each fixed node, and measures an RSSI (Received Signal Strength Indication; received signal strength indication) value of each fixed node; and the first node generates a performance parameter level table according to the foregoing acquired Rank value and measured RSSI value of each fixed node, and selects a fixed node with a highest performance parameter level in the performance parameter level table as the preferred parent node. The Rank value is a parameter that reflects a quantity of hops from the first node to a root node, and the fixed node with the highest performance parameter level is a fixed node with a smallest sum of a level corresponding to the Rank value and a level corresponding to the RSSI value.

According to the foregoing technical solution, when the parent node set of the first node includes at least two fixed nodes, a Rank value and an RSSI value of each fixed node are used as performance parameters of the fixed node. Because a combination of the Rank value and the RSSI value can more accurately reflect performance of different fixed nodes, after a fixed node with a better performance parameter is selected from the at least two fixed nodes as the preferred parent node of the first node, network stability can be practically ensured in a subsequent communication process of the first node, thereby effectively improving network performance.

In the foregoing process, a process of generating the performance parameter level table of the first node includes: acquiring Rank values of all fixed nodes in the parent node set of the first node, sorting the Rank values of all the fixed nodes in ascending order to generate a Rank list, and assigning levels in descending order to the values in the Rank list in sequence; acquiring RSSI values of all fixed nodes or mobile nodes in the foregoing parent node set, sorting the RSSI values of all the fixed nodes or the mobile nodes in descending order to generate an RSSI list, and assigning levels in descending order to the values in the RSSI list in sequence; generating a corresponding two-dimensional table based on the foregoing generated Rank list and RSSI list; and adding the node identification information of the foregoing fixed node to a corresponding location in the foregoing two-dimensional table according to the Rank value and RSSI value of each fixed node in the foregoing parent node set, so as to generate the performance parameter level table.

For example, the parent node set of the first node includes six fixed nodes, which are A1, A2, A3, A4, A5, and A6, where Rank values of A1, A2, A3, A4, A5, and A6 are Rank1, Rank2, Rank 3, Rank 4, Rank5, and Rank 6 in sequence, and in addition, Rank1<Rank2<Rank6<Rank3<Rank4<Rank5; RSSI values of A1, A2, A3, A4, A5, and A6 are RSSI6>RSSI1>RSSI2>RSSI5>RSSI3>RSSI4 in sequence. Different levels are assigned to the Rank values of the foregoing fixed nodes based on the sorting order of the Rank values, that is, a level 1 is assigned to Rank1, a level 2 is assigned to Rank2, a level 3 is assigned to Rank6, a level 4 is assigned to Rank3, a level 5 is assigned to Rank4, and a level 6 is assigned to Rank5; different levels are assigned to the RSSI values of the foregoing fixed nodes based on the sorting order of the RSSI values, that is, a level 1 is assigned to RSSI6, a level 2 is assigned to RSSI1, a level 3 is assigned to RSSI2, a level 4 is assigned to RSSI5, a level 5 is assigned to the RSSI3, and a level 6 is assigned to RSSI4. Based on the levels of the Rank value and RSSI value of each fixed node, the performance parameter level table is obtained. Refer to Table 1.

TABLE 1

| Rank level | RSSI level | | | | | |
| --- | --- | --- | --- | --- | --- | --- |
| | 1 | 2 | 3 | 4 | 5 | 6 |
| 1 | | A1 | | | | |
| 2 | | | A2 | | | |
| 3 | A6 | | | | | |
| 4 | | | | | A3 | |
| 5 | | | | | | A4 |
| 6 | | | A5 | | | |

Based on the foregoing technical solution, in Table 1, the fixed node A1 has a highest performance parameter level; therefore, the fixed node A1 is selected as the preferred parent node of the first node.

Further, when the parent node set of the first node includes at least two fixed nodes with a highest performance parameter level, a fixed node with a minimum Rank value in the at least two fixed nodes is selected as the preferred parent node. For example, in Table 1, if the parent node set does not include the fixed nodes A1, A2, and A6, the performance parameter level (5+4=9) of the fixed node A3 is the same as the performance parameter level (3+6=9) of the fixed node A5, and this performance parameter level is the highest level in the foregoing Table 1. Then the Rank value of the fixed node A3 is compared with the Rank value of the fixed node A5, that is, Rank 3 is compared with Rank5. Because Rank3<Rank5, the fixed node A3 is selected as the preferred parent node of the first node. Using the foregoing technical solution implements a smallest quantity of hops between the selected preferred parent node of the first node and the root node, thereby ensuring network stability.

When the parent node set of the foregoing first node does not include a fixed node, and only includes a mobile node, a process of selecting the preferred parent node of the first node is as follows:

when the parent node set of the foregoing first node includes only one mobile node, the first node selects the mobile node as the preferred parent node.

When the parent node set of the foregoing first node includes at least two mobile nodes, according to a DIO message carrying node identification information corresponding to each mobile node in the foregoing parent node set, the first node acquires a Rank value of each mobile node, and measures an RSSI value of each mobile node; and the first node generates a performance parameter level table based on the foregoing acquired Rank value and RSSI value of each mobile node, and selects a mobile node with a highest performance parameter level in the performance parameter level table as the preferred parent node. The mobile node with the highest performance parameter level is a mobile node with a smallest sum of a level corresponding to the Rank value and a level corresponding to the RSSI value. According to the foregoing technical solution, when the parent node set of the first node includes at least two mobile nodes, an optimal mobile node is selected as the preferred parent node by comprehensively considering the Rank values and the RSSI values, which can practically ensure network stability in a subsequent communication process of the first node, thereby effectively improving network performance.

In the foregoing process, a process of generating the performance parameter level table of the first node includes: acquiring Rank values of all mobile nodes in the parent node set of the first node, sorting the Rank values of all the mobile nodes in ascending order to generate a Rank list, and assigning levels in descending order to the values in the Rank list in sequence; acquiring RSSI values of all the mobile nodes in the foregoing parent node set, sorting the RSSI values of all the mobile nodes in descending order to generate an RSSI list, and assigning levels in descending order to the values in the RSSI list in sequence; generating a corresponding two-dimensional table based on the foregoing generated Rank list and RSSI list; and according to the Rank value and RSSI value of each mobile node in the foregoing parent node set, adding the mobile node to a corresponding location in the two-dimensional table, so as to generate the performance parameter level table.

When the parent node set of the foregoing first node includes at least two mobile nodes with a highest performance parameter level, a mobile node with a maximum RSSI value in the at least two mobile nodes is selected as the preferred parent node. Using the foregoing technical solution implements greatest received signal strength of the selected preferred parent node of the first node, thereby ensuring network stability and a low packet loss rate.

Figure 7A:
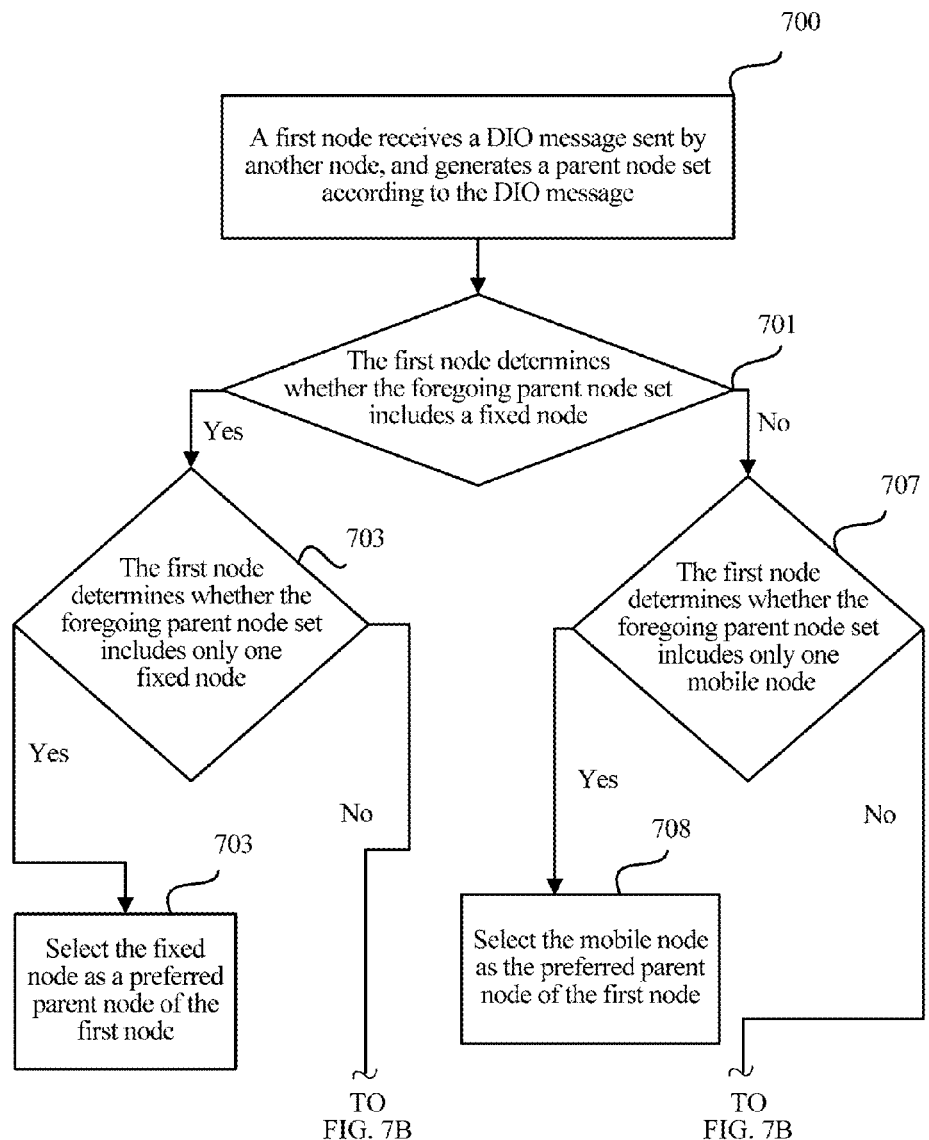
FIG. 7A and FIG. 7B are a detailed flowchart of selecting a preferred parent node in a wireless sensor network according to an embodiment of the disclosure.
Figure 7B:
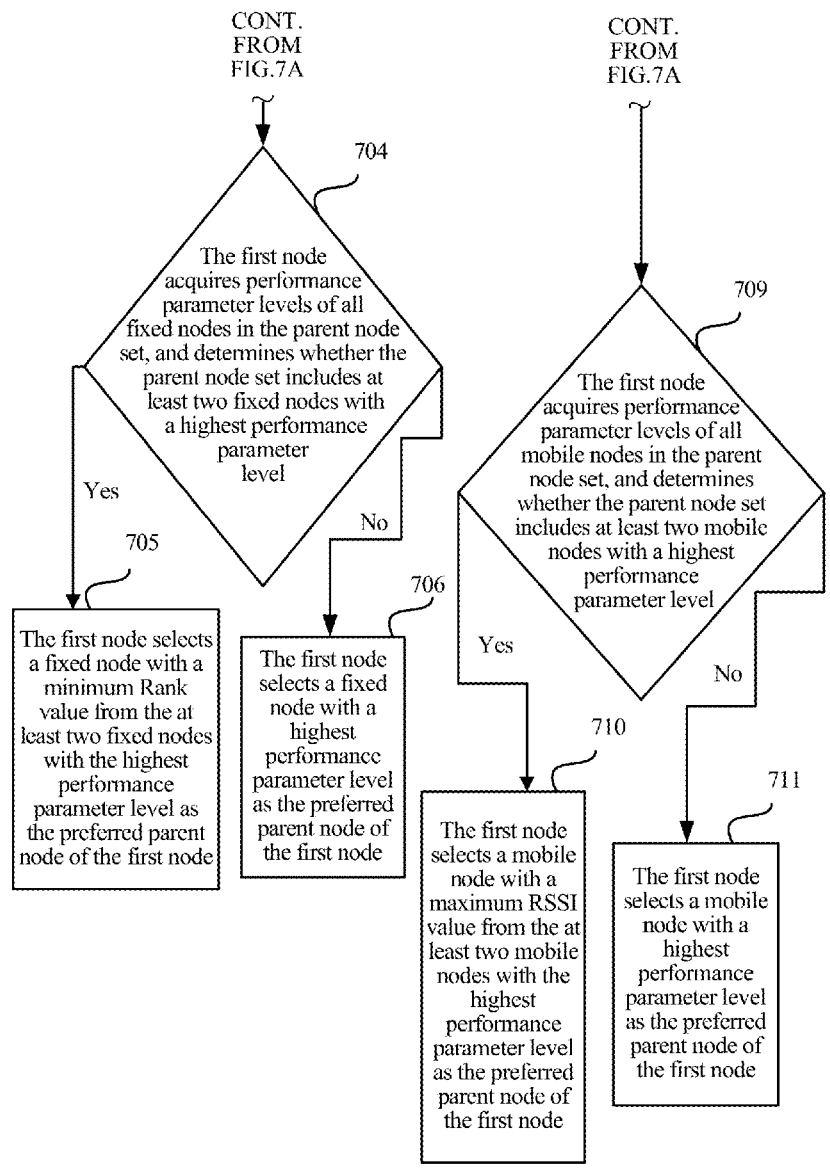

Based on the foregoing technical solution, referring to FIG. 7A and FIG. 7B, in an embodiment of the disclosure, a detailed process of selecting a preferred parent node in a wireless sensor network is as follows:

Step 700: A first node receives a DIO message sent by another node, and generates a parent node set based on the DIO message.

The parent node set includes a node type of each parent node of the first node.

Step 701: The first node determines whether the foregoing parent node set includes a fixed node. If yes, step 702 is performed; otherwise, step 707 is performed.

Step 702: The first node determines whether the foregoing parent node set includes only one fixed node. If yes, step 703 is performed; otherwise, step 704 is performed.

Step 703: Select the fixed node as a preferred parent node of the first node.

According to the foregoing technical solution, the fixed node in the parent node set is preferably selected as the preferred parent node. A feature of higher stability of the fixed node itself can ensure a lower packet loss rate for the first node in a subsequent communication process.

Step 704: The first node acquires performance parameter levels of all fixed nodes in the parent node set, and determines whether the parent node set includes at least two fixed nodes with a highest performance parameter level. If yes, step 705 is performed; otherwise, step 706 is performed.

The first node acquires the performance parameter level of each fixed node according to a Rank value and an RSSI value of each fixed node in the parent node set. The performance parameter levels of the foregoing at least two fixed nodes are the same, and in addition, the at least two fixed nodes are fixed nodes with the highest performance parameter level in all the fixed nodes.

Step 705: The first node selects a fixed node with a minimum Rank value from the at least two fixed nodes with the highest performance parameter level as the preferred parent node of the first node.

According to the foregoing technical solution, when the parent node set of the first node includes at least two fixed nodes, a Rank value and an RSSI value of each fixed node are used as performance parameters of the fixed node. Because a combination of the Rank value and the RSSI value can more accurately reflect performance of different fixed nodes, after a fixed node with a better performance parameter is selected from the at least two fixed nodes as the preferred parent node of the first node, network stability can be practically ensured in a subsequent communication process of the first node, thereby effectively improving network performance.

Step 706: The first node selects a fixed node with a highest performance parameter level as the preferred parent node of the first node.

Step 707: The first node determines whether the foregoing parent node set includes only one mobile node. If yes, step 708 is performed; otherwise, step 709 is performed.

Step 708: Select the mobile node as the preferred parent node of the first node.

Step 709: The first node acquires performance parameter levels of all mobile nodes in the parent node set, and determines whether the parent node set includes at least two mobile nodes with a highest performance parameter level. If yes, step 710 is performed; otherwise, step 711 is performed.

The first node acquires the performance parameter level of each mobile node according to a Rank value and an RSSI value of each mobile node in the parent node set.

Step 710: The first node selects a mobile node with a maximum RSSI value from the at least two mobile nodes with the highest performance parameter level as the preferred parent node of the first node.

Step 711: The first node selects a mobile node with a highest performance parameter level as the preferred parent node of the first node.

With reference to specific application scenarios, the following describes a process of selecting a preferred parent node in a wireless sensor network in different application scenarios.

Figure 8:
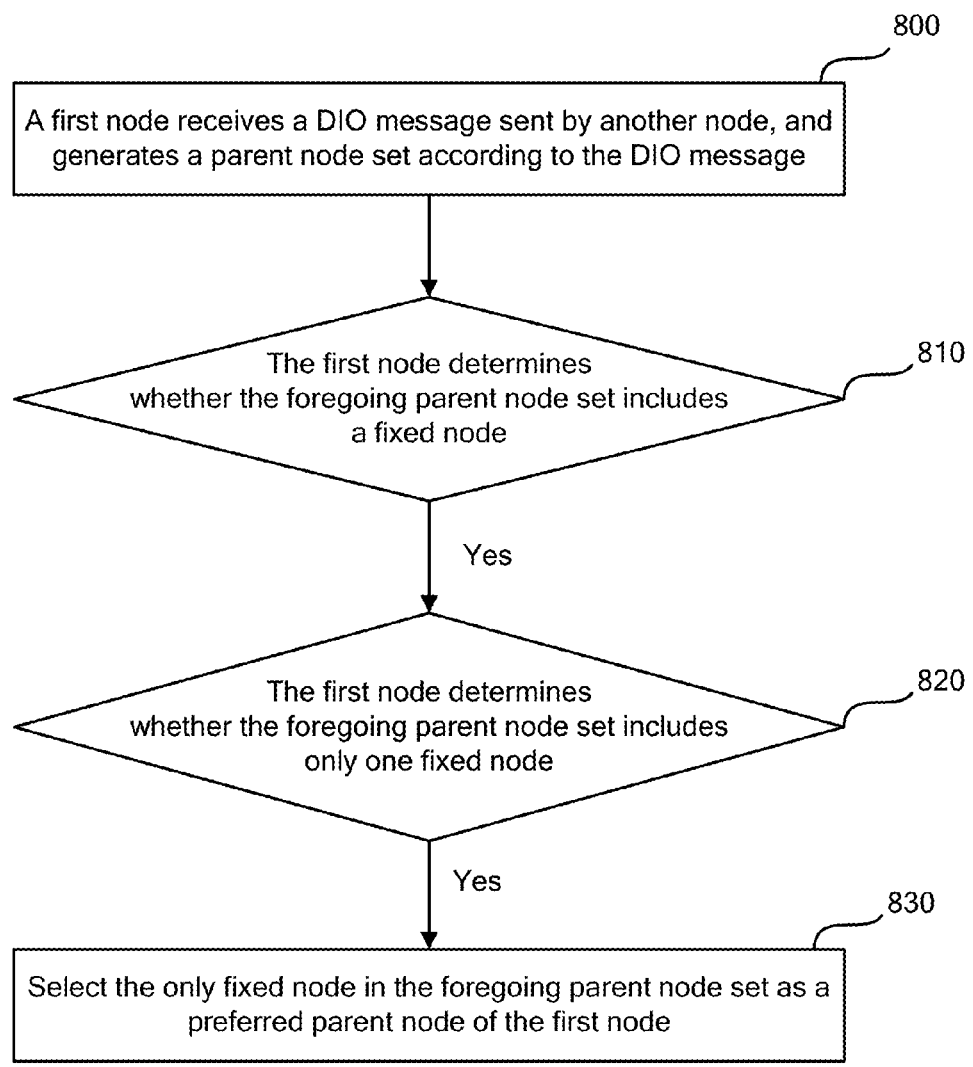
FIG. 8 is Flowchart 1 of selecting a preferred parent node in a wireless sensor network in a specific application scenario according to an embodiment of the disclosure.

Implementation Manner 1:

When a parent node set of a first node includes only one fixed node, referring to FIG. 8, a process of selecting a preferred parent node of the first node is as follows:

Step 800: The first node receives a DIO message sent by another node, and generates a parent node set according to the DIO message.

Step 810: The first node determines whether the foregoing parent node set includes a fixed node. If yes, step 820 is performed.

Step 820: The first node determines whether the foregoing parent node set includes only one fixed node. If yes, step 830 is performed.

Step 830: Select the only fixed node in the foregoing parent node set as a preferred parent node of the first node.

Figure 9:
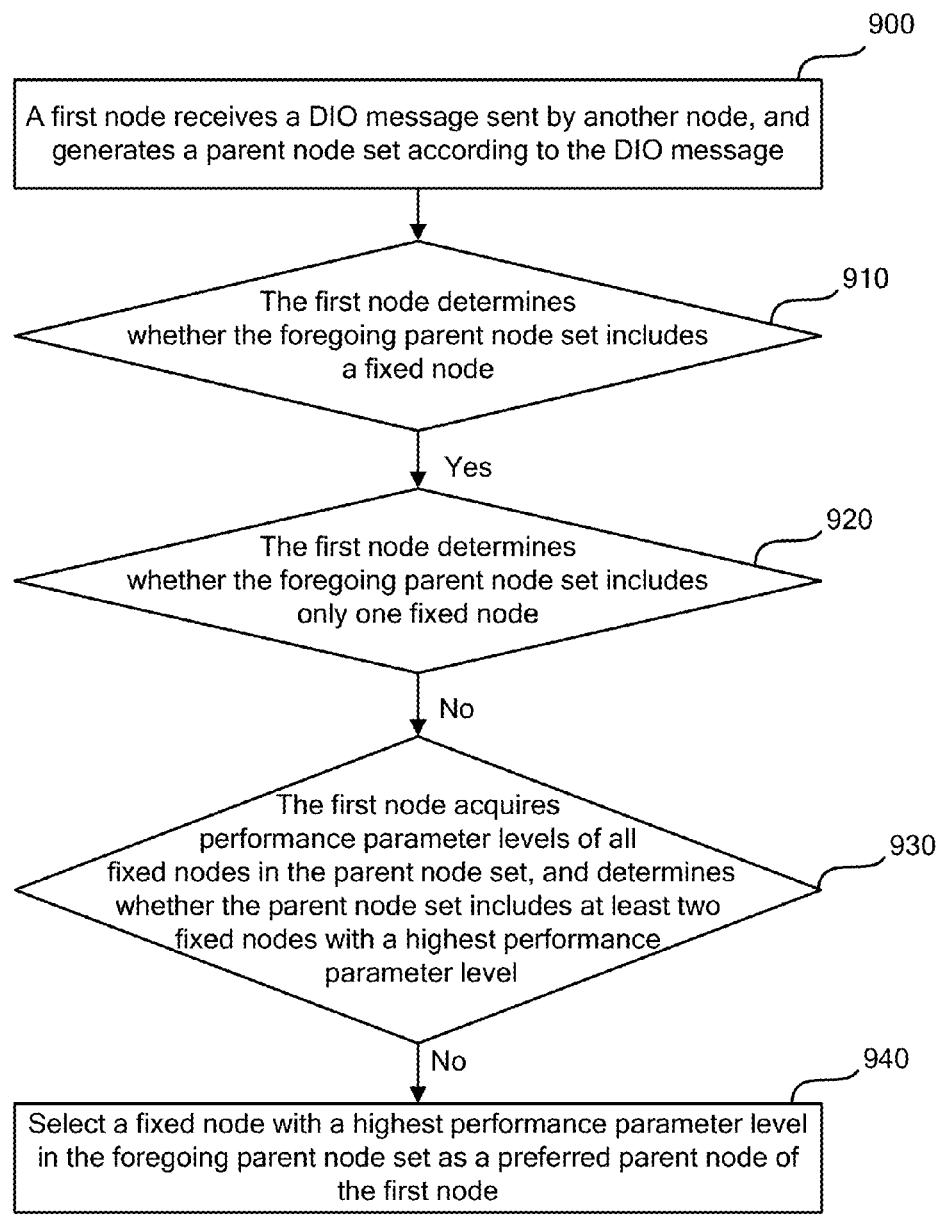
FIG. 9 is Flowchart 2 of selecting a preferred parent node in a wireless sensor network in a specific application scenario according to an embodiment of the disclosure.

Implementation Manner 2:

When a parent node set of a first node only includes at least two fixed nodes, referring to FIG. 9, a process of selecting a preferred parent node of the first node is as follows:

Step 900: The first node receives a DIO message sent by another node, and generates a parent node set according to the DIO message.

Step 910: The first node determines whether the foregoing parent node set includes a fixed node. If yes, step 920 is performed.

Step 920: The first node determines whether the foregoing parent node set includes only one fixed node. If no, step 930 is performed.

Step 930: The first node acquires performance parameter levels of all fixed nodes in the parent node set, and determines whether the parent node set includes at least two fixed nodes with a highest performance parameter level. If no, step 940 is performed.

Step 940: Select a fixed node with a highest performance parameter level in the foregoing parent node set as a preferred parent node of the first node.

Figure 10:
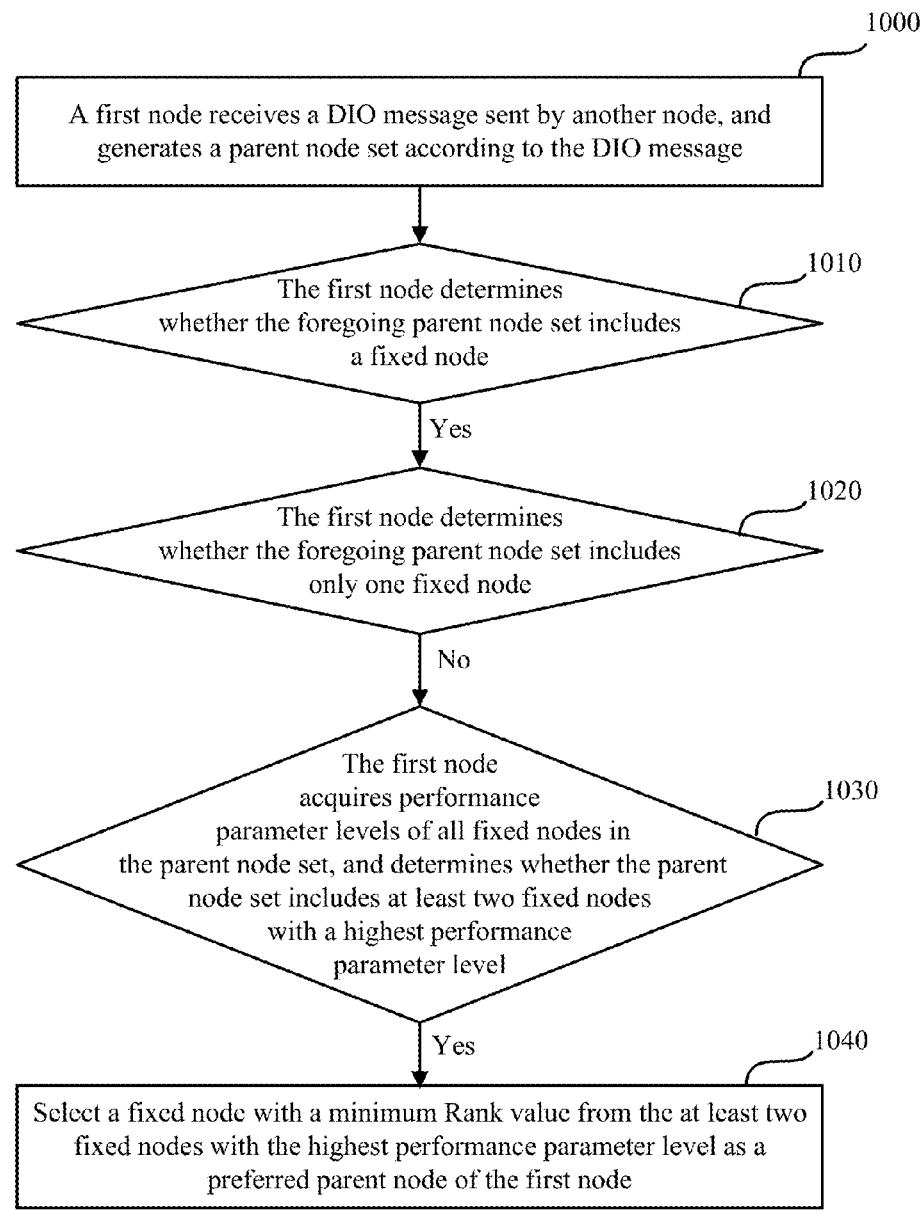
FIG. 10 is Flowchart 3 of selecting a preferred parent node in a wireless sensor network in a specific application scenario according to an embodiment of the disclosure.

Implementation Manner 3:

When a parent node set of a first node only includes at least two fixed nodes, referring to FIG. 10, a process of selecting a preferred parent node of the first node is as follows:

Step 1000: The first node receives a DIO message sent by another node, and generates a parent node set according to the DIO message.

Step 1010: The first node determines whether the foregoing parent node set includes a fixed node. If yes, step 1020 is performed.

Step 1020: The first node determines whether the foregoing parent node set includes only one fixed node. If no, step 1030 is performed.

Step 1030: The first node acquires performance parameter levels of all fixed nodes in the parent node set, and determines whether the parent node set includes at least two fixed node with a highest performance parameter level. If yes, step 1040 is performed.

Step 1040: Select a fixed node with a minimum Rank value from the at least two fixed nodes with the highest performance parameter level as a preferred parent node of the first node.

Figure 11:
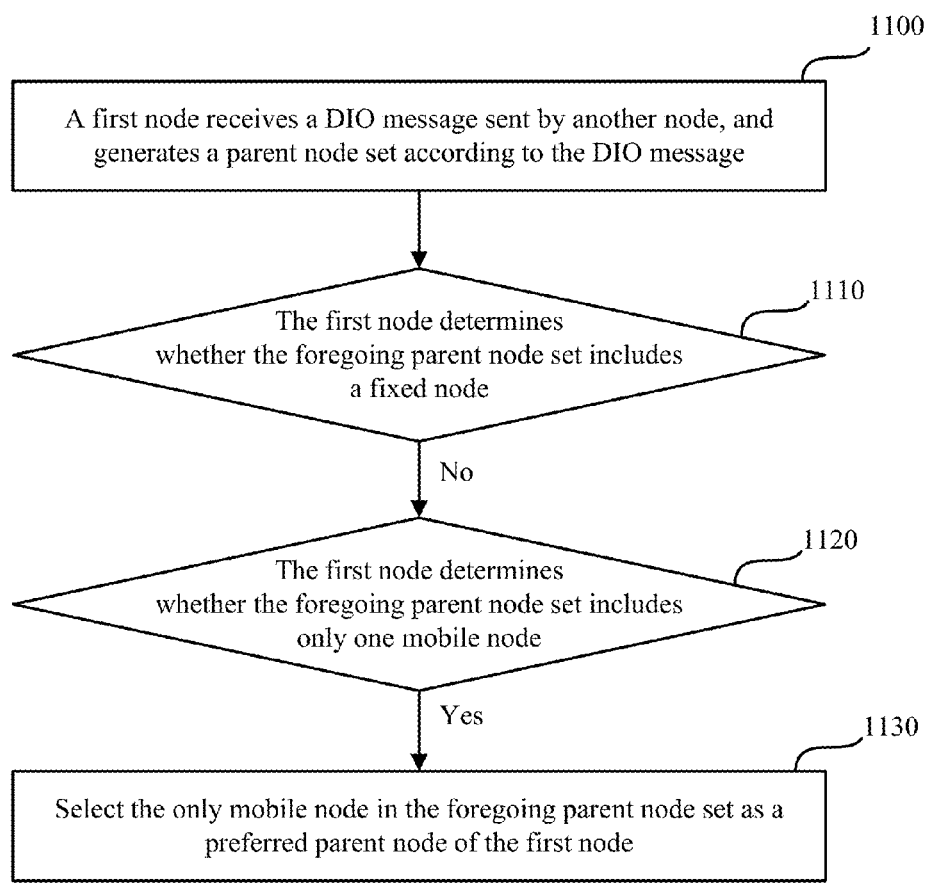
FIG. 11 is Flowchart 4 of selecting a preferred parent node in a wireless sensor network in a specific application scenario according to an embodiment of the disclosure.

Implementation Manner 4:

When a parent node set of a first node includes only one mobile node, referring to FIG. 11, a process of selecting a preferred parent node of the first node is as follows:

Step 1100: The first node receives a DIO message sent by another node, and generates a parent node set according to the DIO message.

Step 1110: The first node determines whether the foregoing parent node set includes a fixed node. If no, step 1120 is performed.

Step 1120: The first node determines whether the foregoing parent node set includes only one mobile node. If yes, step 1130 is performed.

Step 1130: Select the only mobile node in the foregoing parent node set as a preferred parent node of the first node.

Figure 12:
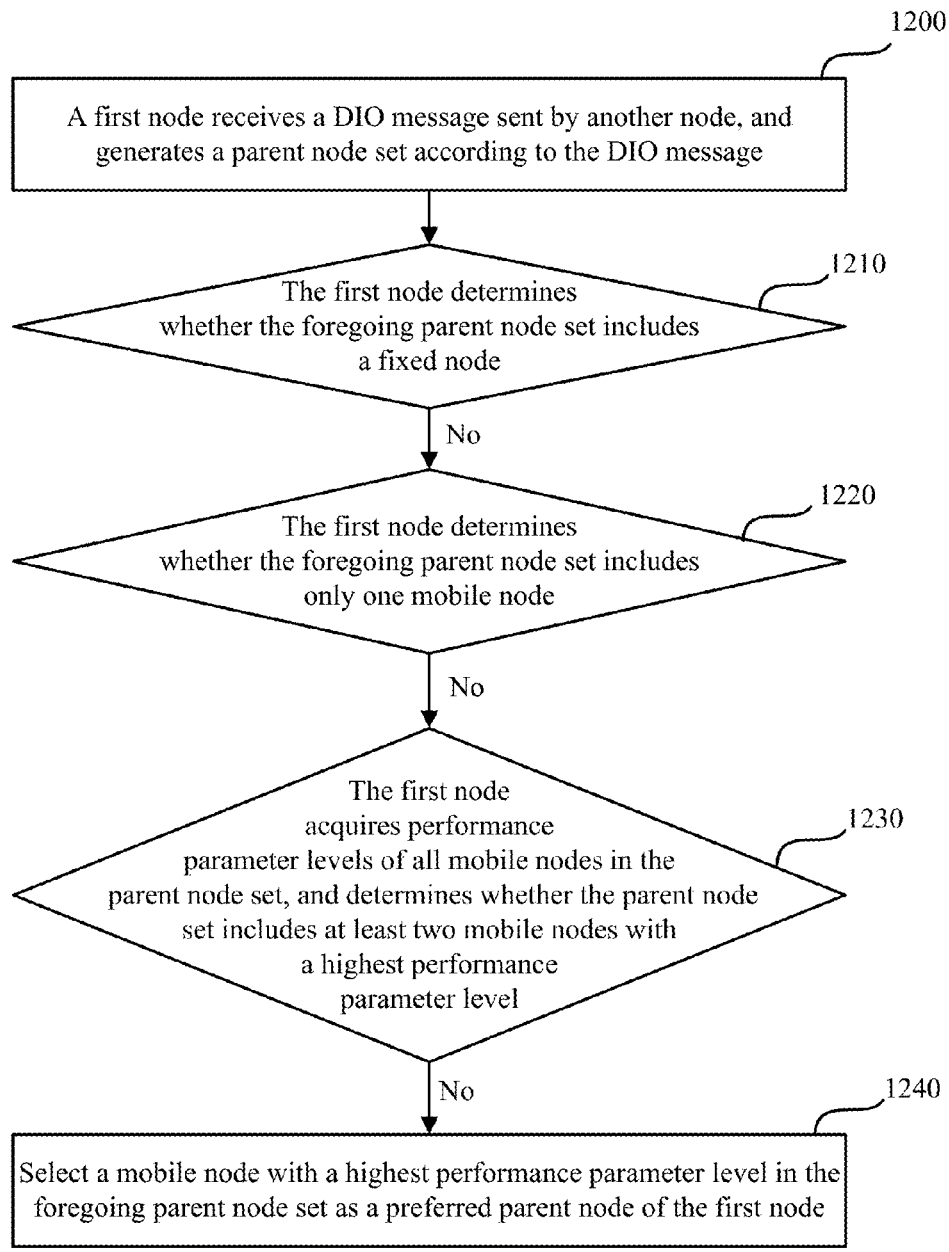
FIG. 12 is Flowchart 5 of selecting a preferred parent node in a wireless sensor network in a specific application scenario according to an embodiment of the disclosure.

Implementation Manner 5:

When a parent node set of a first node only includes at least two mobile nodes, referring to FIG. 12, a process of selecting a preferred parent node of the first node is as follows:

Step 1200: The first node receives a DIO message sent by another node, and generates a parent node set according to the DIO message.

Step 1210: The first node determines whether the foregoing parent node set includes a fixed node. If no, step 1220 is performed.

Step 1220: The first node determines whether the parent node set includes only one mobile node. If no, step 1230 is performed.

Step 1230: The first node acquires performance parameter levels of all mobile nodes in the parent node set, and determines whether the parent node set includes at least two mobile nodes with a highest performance parameter level. If no, step 1240 is performed.

Step 1240: Select a mobile node with a highest performance parameter level in the foregoing parent node set as a preferred parent node of the first node.

Figure 13:
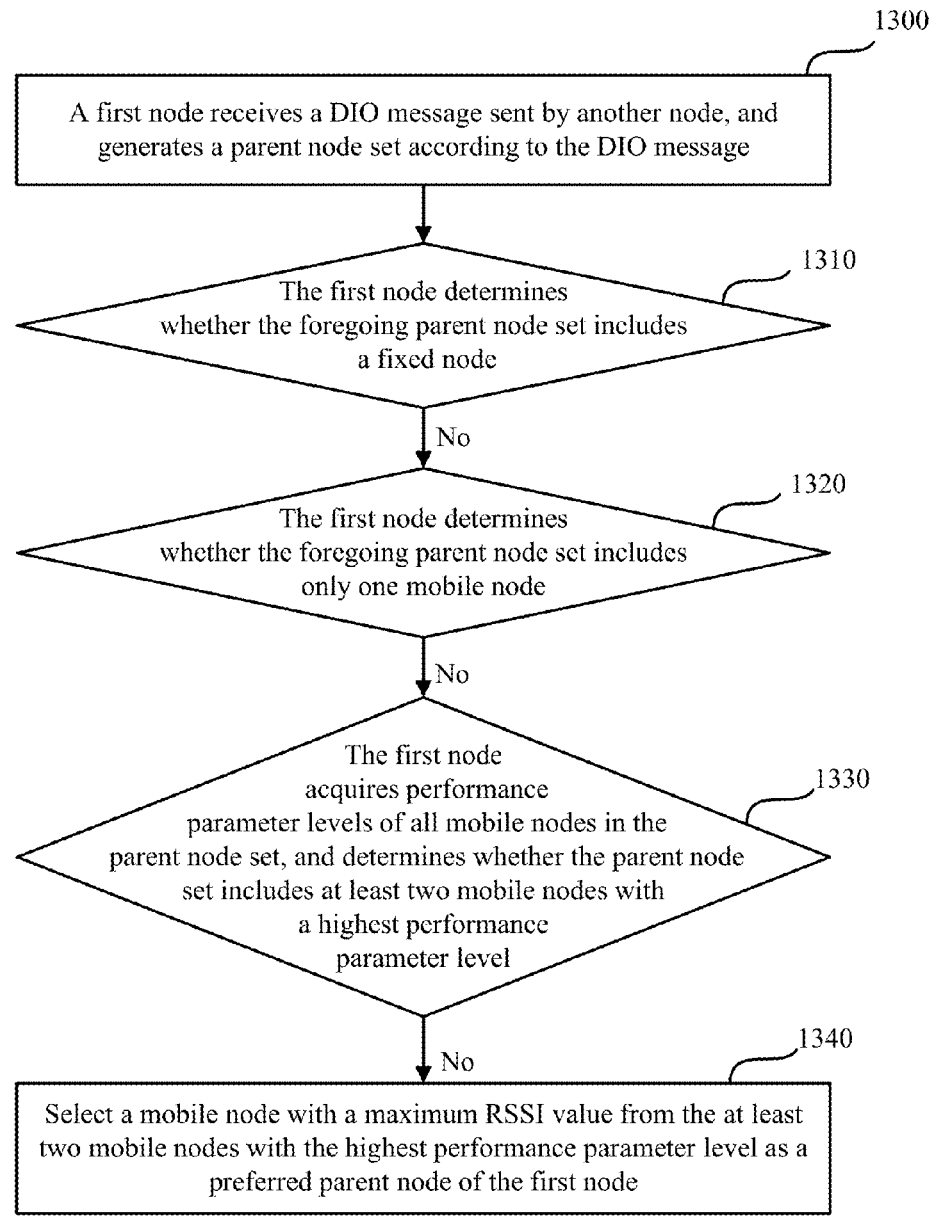
FIG. 13 is Flowchart 6 of selecting a preferred parent node in a wireless sensor network in a specific application scenario according to an embodiment of the disclosure.

Implementation Manner 6:

When a parent node set of a first node only includes at least two mobile nodes, referring to FIG. 13, a process of selecting a preferred parent node of the first node is as follows:

Step 1300: The first node receives a DIO message sent by another node, and generates a parent node set according to the DIO message.

Step 1310: The first node determines whether the foregoing parent node set includes a fixed node. If no, step 1320 is performed.

Step 1320: The first node determines whether the foregoing parent node set includes only one mobile node. If no, step 1330 is performed.

Step 1330: The first node acquires performance parameter levels of all mobile nodes in the parent node set, and determines whether the parent node set includes at least two mobile nodes with a highest performance parameter level. If yes, step 1340 is performed.

Step 1340: Select a mobile node with a maximum RSSI value from the at least two mobile nodes with the highest performance parameter level as a preferred parent node of the first node.

Figure 14:
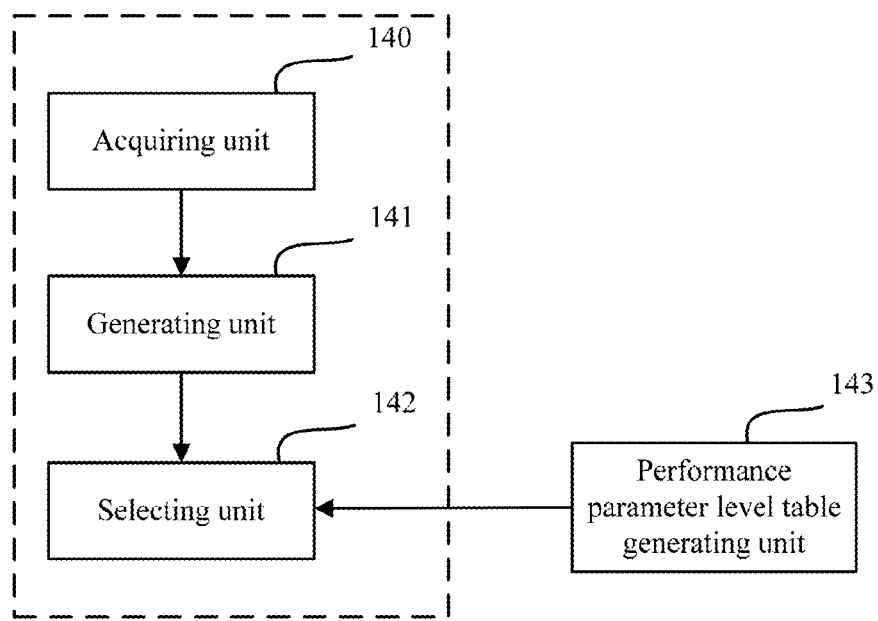
FIG. 14 is an apparatus for selecting a preferred parent node in a wireless sensor network according to an embodiment of the disclosure.

Based on the foregoing technical solution, referring to FIG. 14, the disclosure provides an apparatus for selecting a preferred parent node in a wireless sensor network, including an acquiring unit 140, a generating unit 141, and a selecting unit 142, where:

the acquiring unit 140 is configured to: for all DIO messages, separately acquire node identification information carried in each of the DIO messages, and send the node identification information to the generating unit 141;

the generating unit 141 is configured to receive the node identification information sent by the acquiring unit 140, generate a parent node set based on the node identification information, and send the parent node set to the selecting unit 142; and the selecting unit 142 is configured to: receive the parent node set sent by the generating unit 141; select a fixed node with a highest performance parameter level as a preferred parent node when it is determined that the parent node set includes at least two fixed nodes; and select a mobile node with a highest performance parameter level as the preferred parent node when it is determined that the foregoing parent node set does not include a fixed node, and includes at least two mobile nodes.

The foregoing apparatus further includes a performance parameter level table generating unit 143, configured to: acquire Rank values of all fixed nodes or all mobile nodes in the parent node set, sort the Rank values of all the fixed nodes or all the mobile nodes in ascending order to generate a Rank list, and assign levels in descending order to the values in the Rank list in sequence; acquire RSSI values of all the fixed nodes or all the mobile nodes in the foregoing parent node set, sort the RSSI values of all the fixed nodes or all the mobile nodes in descending order to generate an RSSI list, and assign levels in descending order to the values in the RSSI list to the order in sequence; and according to the Rank value and RSSI value of each fixed node or each mobile node in the foregoing parent node set, add the node identification information of the foregoing fixed node or mobile node to a corresponding location in a two-dimensional table, so as to generate a performance parameter level table.

Figure 15:
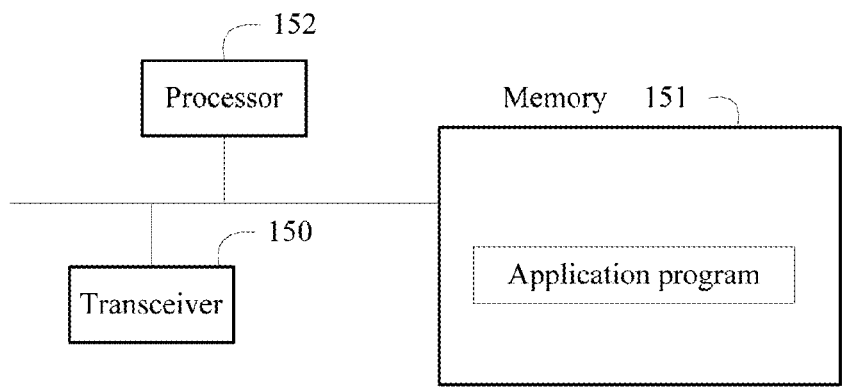
FIG. 15 is a device for selecting a preferred parent node in a wireless sensor network according to an embodiment of the disclosure.

Referring to FIG. 15, the disclosure further provides a device for selecting a preferred parent node in a wireless sensor network, including a transceiver 150, a memory 151, and a processor 152, where the transceiver 150 is configured to receive a DIO message sent by another node;

the memory 151 is configured to store an application program; and the processor 152 is configured to invoke the application program in the memory 151 to perform the following operations:

for all received DIO messages, separately acquiring node identification information carried in each of the DIO messages, and generating a parent node set based on all the acquired node identification information; selecting a fixed node with a highest performance parameter level as a preferred parent node when it is determined that the parent node set includes at least two fixed nodes; and selecting a mobile node with a highest performance parameter level as the preferred parent node when it is determined that the foregoing parent node set does not include a fixed node, and includes at least two mobile nodes.

The processor 152 is further configured to: when it is determined that the foregoing parent node set includes one fixed node, select the fixed node as the preferred parent node. According to the foregoing technical solution, the fixed node in the parent node set is preferably selected as the preferred parent node. A feature of higher stability of the fixed node itself can ensure a lower packet loss rate for the first node in a subsequent communication process.

The processor 152 is configured to: according to a DIO message carrying node identification information corresponding to each fixed node in the forgoing parent node set, acquire a Rank value of the foregoing each fixed node, and measure a received signal strength indicator RSSI value of each fixed node; and generate a performance parameter level table based on the Rank value and RSSI value of each fixed node, and select a fixed node with a highest performance parameter level in the performance parameter level table as the preferred parent node. According to the foregoing technical solution, when the parent node set of the first node includes at least two fixed nodes, a Rank value and an RSSI value of each fixed node are used as performance parameters of the fixed node. Because a combination of the Rank value and the RSSI value can more accurately reflect performance of different fixed nodes, after a fixed node with a better performance parameter is selected from the at least two fixed nodes as the preferred parent node of the first node, network stability can be practically ensured in a subsequent communication process of the first node, thereby effectively improving network performance.

The processor 152 is further configured to: when the foregoing parent node set includes at least two fixed nodes with a highest performance parameter level, select a fixed node with a minimum Rank value in the at least two fixed nodes as the preferred parent node. Using the foregoing technical solution implements a smallest quantity of hops between the selected preferred parent node of the first node and a root node, thereby ensuring network stability.

The processor 152 is further configured to: when it is determined that the foregoing parent node set does not include a fixed node, and includes one mobile node, select the mobile node as the preferred parent node.

The processor 152 is configured to: according to a DIO message carrying node identification information corresponding to each mobile node in the foregoing parent node set, acquire a Rank value of each mobile node, and measure an RSSI value of the foregoing each mobile node; and generate a performance parameter level table based on the Rank value and RSSI value of each mobile node, and select a mobile node with a highest performance parameter level in the performance parameter level table as the preferred parent node. According to the foregoing technical solution, when the parent node set of the first node includes at least two mobile nodes, an optimal mobile node is selected as the preferred parent node by comprehensively considering the Rank values and the RSSI values, which can practically ensure network stability in a subsequent communication process of the first node, thereby effectively improving network performance.

The processor 152 is further configured to: when the foregoing parent node set includes at least two fixed nodes with a highest performance parameter level, select a mobile node with a maximum RSSI value in the at least two mobile nodes as the preferred parent node. Using the foregoing technical solution implements greatest received signal strength of the selected preferred parent node of the first node, thereby ensuring network stability and a low packet loss rate.

The processor 152 is further configured to: acquire Rank values of all fixed nodes or all mobile nodes in the foregoing parent node set, sort the Rank values of all the fixed nodes or all the mobile nodes in ascending order to generate a Rank list, and assign levels in descending order to the values in the Rank list in sequence; acquire RSSI values of all the fixed nodes or all the mobile nodes in the foregoing parent node set, sort the RSSI values of all the fixed nodes or all the mobile nodes in descending order to generate an RSSI list, and assign levels in descending order to the values in the RSSI list in sequence; and according to the Rank value and RSSI value of each fixed node or each mobile node in the foregoing parent node set, add the node identification information of the fixed node or the mobile node to a corresponding location in a two-dimensional table, so as to generate the performance parameter level table.

In conclusion, in this embodiment of the disclosure, according to all received DIO messages, a first node separately acquires node identification information carried in each of the DIO messages, and generates a parent node set based on all the acquired node identification information; the first node selects a fixed node with a highest performance parameter level as a preferred parent node when it is determined that the foregoing parent node set includes at least two fixed nodes; and the first node selects a mobile node with a highest performance parameter level as the preferred parent node when it is determined that the foregoing parent node set does not include a fixed node, and includes at least two mobile nodes. In the technical solutions of the disclosure, the preferred parent node is selected for any one node in a wireless sensor network according to a node type and a performance parameter level that are of each node in the parent node set in sequence, which ensures that the selected preferred parent node is an optimal parent node in parent nodes of the any one node and ensures that the any one node performs communication on a link with best communication quality, thereby reducing a system packet loss rate and improving network performance.

Persons skilled in the art should understand that the embodiments of the disclosure may be provided as a method, a system, or a computer program product. Therefore, the embodiments may use a form of hardware only embodiments, software only embodiments, or embodiments with a combination of software and hardware. Moreover, the embodiments may use a form of a computer program product that is implemented on one or more computer-usable storage media (including but not limited to a disk memory, a CD-ROM, an optical memory, and the like) that include computer-usable program code.

The technical solutions are described with reference to the flowcharts and/or block diagrams of the method, the device (system), and the computer program product according to the embodiments of the disclosure. It should be understood that computer program instructions may be used to implement each process and/or each block in the flowcharts and/or the block diagrams and a combination of a process and/or a block in the flowcharts and/or the block diagrams. These computer program instructions may be provided for a general-purpose computer, a dedicated computer, an embedded processor, or a processor of any other programmable data processing device to generate a machine, so that the instructions executed by a computer or a processor of any other programmable data processing device generate an apparatus for implementing a specific function in one or more processes in the flowcharts and/or in one or more blocks in the block diagrams.

These computer program instructions may also be stored in a computer-readable memory that can instruct the computer or any other programmable data processing device to work in a specific manner, so that the instructions stored in the computer-readable memory generate an artifact that includes an instruction apparatus. The instruction apparatus implements a specific function in one or more processes in the flowcharts and/or in one or more blocks in the block diagrams.

These computer program instructions may also be loaded onto a computer or another programmable data processing device, so that a series of operations and steps are performed on the computer or the another programmable device, thereby generating computer-implemented processing. Therefore, the instructions executed on the computer or the another programmable device provide steps for implementing a specific function in one or more processes in the flowcharts and/or in one or more blocks in the block diagrams.

Although some exemplary embodiments of the disclosure have been described, persons skilled in the art can make changes and modifications to these embodiments once they learn the basic inventive concept. Therefore, the following claims are intended to be construed as to cover the exemplary embodiments and all changes and modifications falling within the scope of the present application.

Obviously, persons skilled in the art can make various modifications and variations to the embodiments of the disclosure without departing from the scope of the embodiments of the disclosure. The present application is intended to cover these modifications and variations provided that they fall within the scope of protection defined by the following claims and their equivalent technologies.

What is claimed is:

1. A method for selecting a preferred parent node in a wireless sensor network, the method comprising:
   for all received Destination Oriented Directed Acyclic Graph Information Object (DIO) messages, acquiring node identification information carried in each of the DIO messages, and generating a parent node set based on all the acquired node identification information;
   selecting a fixed node with a highest performance parameter level as a preferred parent node when the parent node set comprises at least two fixed nodes;
   selecting a mobile node with a highest performance parameter level as the preferred parent node when the parent node set does not comprise a fixed node, and comprises at least two mobile nodes; and
   for each selected fixed or mobile node in the parent node set,
      a) acquiring a Rank value, and
      b) measuring an RSSI value,
   according to the DIO message carrying node identification information corresponding to each of the selected fixed or mobile node.

2. The method according to claim 1, further comprising:
   when it is determined that the parent node set comprises one fixed node, selecting the fixed node as the preferred parent node.

3. The method according to claim 1, wherein selecting the fixed node with the highest performance parameter level as the preferred parent node when the parent node set comprises at least two fixed nodes comprises:
   generating a performance parameter level table based on the Rank value and RSSI value of each fixed node, and selecting a fixed node with a highest performance parameter level in the performance parameter level table as the preferred parent node.

4. The method according to claim 3, further comprising:
   when the parent node set comprises at least two fixed nodes with a highest performance parameter level, selecting a fixed node with a minimum Rank value in the at least two fixed nodes as the preferred parent node.

5. The method according to claim 3, wherein the generating a performance parameter level table comprises:
   acquiring Rank values of all fixed nodes in the parent node set, sorting the Rank values of all the fixed nodes in ascending order to generate a Rank list, and assigning levels in descending order to the values in the Rank list in sequence;
   acquiring RSSI values of all the fixed nodes in the parent node set, sorting the RSSI values of all the fixed nodes in descending order to generate an RSSI list, and assigning levels in descending order to the values in the RSSI list in sequence; and
   according to the Rank value and RSSI value of each fixed node in the parent node set, adding the node identification information of the fixed node to a corresponding location in a two-dimensional table, so as to generate the performance parameter level table.

6. The method according to claim 1, further comprising:
   when it is determined that the parent node set does not comprise a fixed node, and comprises one mobile node, selecting the mobile node as the preferred parent node.

7. The method according to claim 1, wherein selecting the mobile node with the highest performance parameter level as the preferred parent node when the parent node set does not comprise a fixed node, and comprises at least two mobile nodes comprises:
   generating a performance parameter level table based on the Rank value and RSSI value of each mobile node, and selecting a mobile node with a highest performance parameter level in the performance parameter level table as the preferred parent node.

8. The method according to claim 7, further comprising:
   when the parent node set comprises at least two mobile nodes with a highest performance parameter level, selecting a mobile node with a maximum RSSI value in the at least two mobile nodes as the preferred parent node.

9. The method according to claim 7, wherein the generating a performance parameter level table comprises:
   acquiring Rank values of all mobile nodes in the parent node set, sorting the Rank values of all the mobile nodes in ascending order to generate a Rank list, and assigning levels in descending order to the values in the Rank list in sequence;

acquiring RSSI values of all the mobile nodes in the parent node set, sorting the RSSI values of all the mobile nodes in descending order to generate an RSSI list, and assigning levels in descending order to the values in the RSSI list in sequence; and according to the Rank value and RSSI value of each mobile node in the parent node set, adding the node identification information of the mobile node to a corresponding location in a two-dimensional table, so as to generate the performance parameter level table.

10. An apparatus for selecting a preferred parent node in a wireless sensor network, comprising:

a transceiver, configured to receive at least one Destination Oriented Directed Acyclic Graph Information Object (DIO) message; and a processor, configured to separately acquire node identification information carried in each of the received DIO messages, generate a parent node set based on the node identification information, select a fixed node with a highest performance parameter level as a preferred parent node when it is determined that the parent node set comprises at least two fixed nodes, and select a mobile node with a highest performance parameter level as the preferred parent node when it is determined that the parent node set does not comprise a fixed node, and comprises at least two mobile nodes; and for each selected fixed or mobile node in the parent node set,
  a) acquiring a Rank value, and
  b) measuring an RSSI value, according to the DIO message carrying node identification information corresponding to each of the selected fixed or mobile node.

11. The apparatus according to claim 10, wherein the processor is further configured to:

when it is determined that the parent node set comprises one fixed node, select the fixed node as the preferred parent node.

12. The apparatus according to claim 10, wherein the processor is specifically configured to:

generate a performance parameter level table based on the Rank value and RSSI value of each fixed node, and select a fixed node with a highest performance parameter level in the performance parameter level table as the preferred parent node.

13. The apparatus according to claim 12, wherein the processor is further configured to:

when the parent node set comprises at least two fixed nodes with a highest performance parameter level, select a fixed node with a minimum Rank value in the at least two fixed nodes as the preferred parent node.

14. The apparatus according to claim 12, wherein the processor is further configured to:

acquire Rank values of all fixed nodes in the parent node set, sort the Rank values of all the fixed nodes in ascending order to generate a Rank list, and assign levels in descending order to the values in the Rank list in sequence;

acquire RSSI values of all the fixed nodes in the parent node set, sort the RSSI values of all the fixed nodes in descending order to generate an RSSI list, and assign levels in descending order to the values in the RSSI list in sequence;

and according to the Rank value and RSSI value of each fixed node in the parent node set, add the node identification information of the fixed node to a corresponding location in a two-dimensional table, so as to generate the performance parameter level table.

15. The apparatus according to claim 10, wherein the processor is further configured to:

when it is determined that the parent node set does not comprise a fixed node, and comprises one mobile node, select the mobile node as the preferred parent node.

16. The apparatus according to claim 10, wherein in selecting the preferred parent node, the processor is configured to:

generate a performance parameter level table based on the Rank value and RSSI value of each mobile node, and select a mobile node with a highest performance parameter level in the performance parameter level table as the preferred parent node.

17. The apparatus according to claim 16, wherein the processor is further configured to:

when the parent node set comprises at least two mobile nodes with a highest performance parameter level, select a mobile node with a maximum RSSI value in the at least two mobile nodes as the preferred parent node.

18. The apparatus according to claim 16, wherein the processor is further configured to:

acquire Rank values of all mobile nodes in the parent node set, sort the Rank values of all the mobile nodes in ascending order to generate a Rank list, and assign levels in descending order to the values in the Rank list in sequence;

acquire RSSI values of all the mobile nodes in the parent node set, sort the RSSI values of all the mobile nodes in descending order to generate an RSSI list, and assign levels in descending order to the values in the RSSI list in sequence;

and according to the Rank value and RSSI value of each mobile node in the parent node set, add the node identification information of the mobile node to a corresponding location in a two-dimensional table, so as to generate the performance parameter level table.

* * * * *